United States Patent [19]
Lewis

[11] Patent Number: 6,112,915
[45] Date of Patent: *Sep. 5, 2000

[54] PUSH-BACK STORAGE RACK

[76] Inventor: Lyman F. Lewis, 9700 Homerich, Byron Center, Mich. 49315

[ * ] Notice: This patent is subject to a terminal disclaimer.

[21] Appl. No.: 08/388,634

[22] Filed: Feb. 14, 1995

[51] Int. Cl.⁷ .................................................. A47F 5/08
[52] U.S. Cl. .................. 211/151; 211/162; 414/276; 414/286
[58] Field of Search .................................. 211/59.2, 151, 211/162; 414/276, 286

[56] References Cited

U.S. PATENT DOCUMENTS

| | | |
|---|---|---|
| 166,976 | 8/1875 | Eppelsheimer . |
| 1,448,119 | 3/1923 | Hutton . |
| 1,463,137 | 7/1923 | Makepeace . |
| 1,795,846 | 3/1931 | Drake . |
| 2,019,949 | 11/1935 | Brace . |
| 2,575,055 | 11/1951 | Jaeger . |
| 2,988,012 | 6/1961 | Markley et al. . |
| 3,465,894 | 9/1969 | Setecka . |
| 3,465,897 | 9/1969 | Schumann et al. . |
| 3,782,293 | 1/1974 | Donohue et al. . |
| 4,003,315 | 1/1977 | Barth . |
| 4,227,466 | 10/1980 | Rooklyn . |
| 4,341,313 | 7/1982 | Doring . |
| 4,359,946 | 11/1982 | Marvin . |
| 4,462,500 | 7/1984 | Konstant et al. . |
| 4,687,404 | 8/1987 | Seiz et al. . |
| 4,773,546 | 9/1988 | Konstant . |
| 4,915,240 | 4/1990 | Konstant . |
| 5,062,536 | 11/1991 | Tsai .......................................... 211/162 |
| 5,080,241 | 1/1992 | Konstant . |
| 5,117,990 | 6/1992 | Krummell et al. . |
| 5,141,118 | 8/1992 | Gay . |
| 5,180,069 | 1/1993 | Krummell et al. . |
| 5,203,464 | 4/1993 | Allen ........................................ 211/151 |
| 5,312,004 | 5/1994 | Krummell et al. ..................... 211/151 |
| 5,350,270 | 9/1994 | Stallard et al. ..................... 211/151 X |
| 5,419,444 | 5/1995 | Strom ..................................... 211/151 |
| 5,476,180 | 12/1995 | Konstant ................................ 211/151 |
| 5,482,422 | 1/1996 | Hammond ........................... 211/151 X |

FOREIGN PATENT DOCUMENTS

| | | |
|---|---|---|
| 959922 | 3/1957 | Germany . |
| 1226470 | 9/1989 | Japan . |
| 3264414 | 11/1991 | Japan . |
| WO86/04569 | 8/1986 | WIPO . |

*Primary Examiner*—Leslie A. Braun
*Assistant Examiner*—Richard M. Smith
*Attorney, Agent, or Firm*—Waters & Morse, P.C.

[57] ABSTRACT

A push-back storage rack comprises a frame defining at least one storage bay having a depth sufficient to accommodate a plurality of separate storage units; and a track-mounted carriage assembly mounted in the bay. The carriage assembly comprises at least two articulated carts connected together end-to-end for pivotal movement about a transverse horizontal axis. The carts ride on a track that has an upper track section, a lower track section, and an arcuate front section that joins the upper and lower track sections. The track guides the carts for movement between the front and the rear of the bay on the upper track section and directs the carts downwardly and then rearwardly on the lower track section in an inverted position as the carts move forwardly at the front end of the upper track section. The carts are thus stored underneath the upper track section and are brought upwardly to the upper track section as the carts are filled and moved rearwardly in the upper track section.

20 Claims, 10 Drawing Sheets

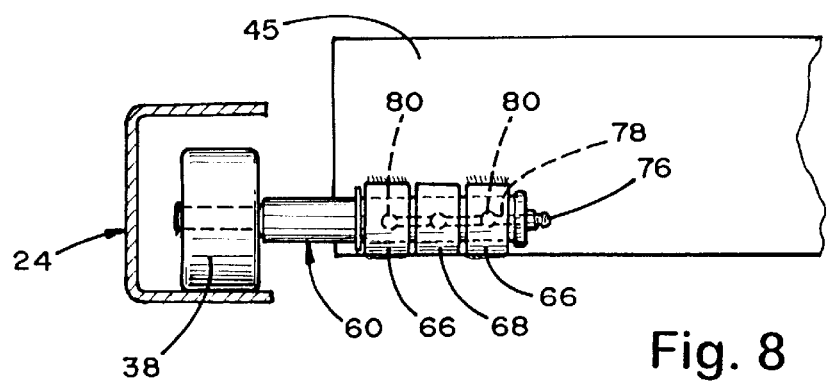
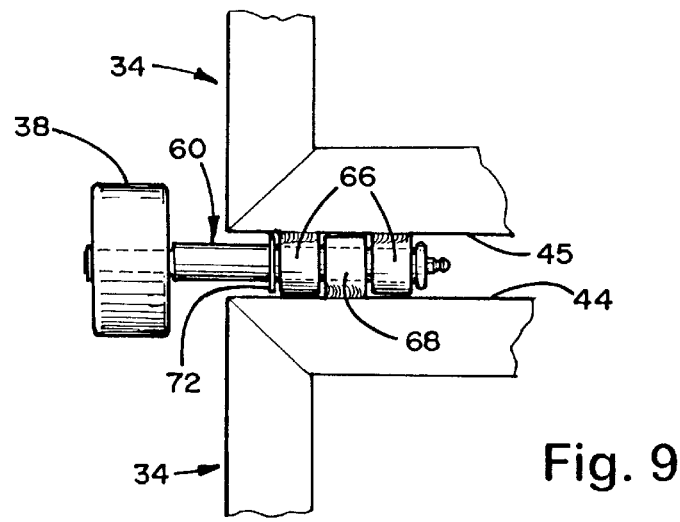
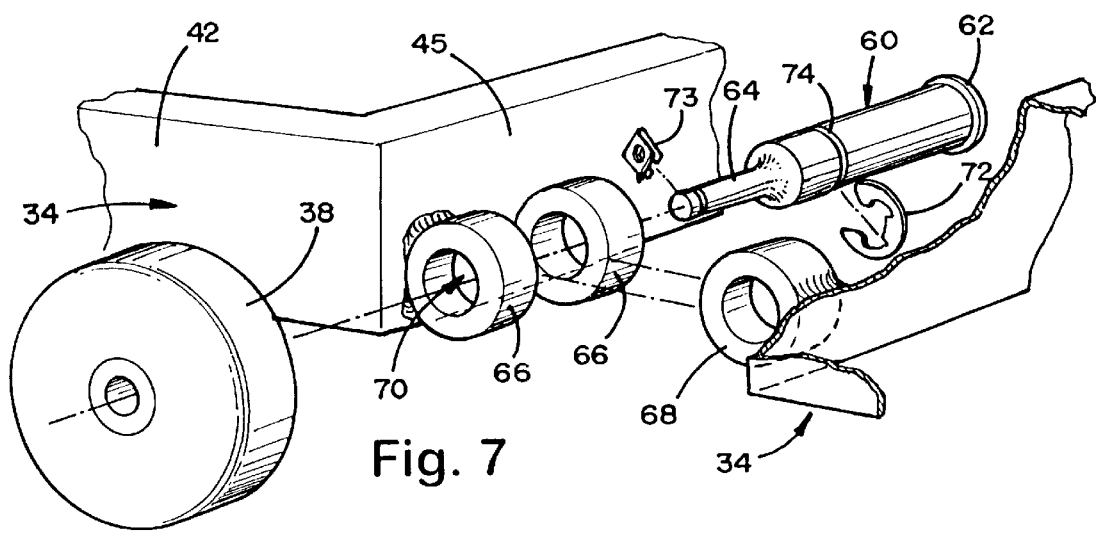

PUSH-BACK STORAGE RACK

BACKGROUND OF THE INVENTION

1. Field of the Invention

The present invention relates to push-back storage racks used in warehousing and more particularly to a push-back storage rack wherein moveable pallet carts are connected end-to-end and wrap around and fit under an upper storage rack.

2. Description of Prior Art

Warehouse storage racks typically comprise a frame structure divided into rows and columns that define storage bays for depositing storage units (e.g., pallets) of products to be stored. In order to conserve space in a storage facility, storage bays are sometimes more than one pallet deep, and moveable carriages, called "push-back racks", are used to permit pallets to be moved to rearward storage locations from a single loading station at the front of the rack system. Most push-back racks employ overlying or nesting platforms that fit one on top of the other at the front storage compartment in the bay. As each platform is loaded and pushed rearwardly, the next platform is made available for the next pallet. Generally, the tracks on which the pallets are mounted are inclined forwardly so that gravity causes the pallets to slide or roll to the front of the storage bay. The track mechanisms and carts required for this type of push-back rack can be complex and expensive, and the system requires a different cart construction for each storage location in the bay. Moreover, the maximum storage unit depth of each bay is limited with stacking carts, and the stacking carts introduce height limitations into the bay.

An object of the present invention is to provide a simplified and effective push-back rack system that does not encounter the drawbacks of the prior systems.

SUMMARY OF THE INVENTION

In accordance with the present invention, a push-back storage rack comprises a frame defining at least one storage bay having a depth sufficient to accommodate a plurality of separate storage units; a track-mounted carriage assembly is mounted in the bay. The carriage assembly comprises at least two carts, each sized to hold separate pallets or other storage units. The carts are connected together end-to-end for pivotal movement about a transverse horizontal axis. The track on which the carts ride has an upper track section which guides the carts for movement between the front and the rear of the bay. The track also includes a forward section and a lower track section which direct the carts downwardly and then rearwardly in the bay in an inverted position as the carts move forwardly at the front end of the upper track section. The carts are thus stored underneath the upper track section and are brought upwardly to the upper track section for use as the rearmost carts on the upper track section are filled and moved rearwardly on the upper track section.

The preferred track of the present invention comprises opposed C-shaped track members at opposite sides of the storage bay, with the forward portion of the track section comprising an arcuate section that connects the upper and lower track sections. Other track constructions are possible.

The storage carts are wheeled carts that ride in the track, with each wheeled cart preferably comprising a plurality of separate wheeled cart sections connected together for pivotal movement about a horizontal transverse axis. Desirably, the individual cart sections also are articulated at an intermediate longitudinal point to provide even further bending ability for the cart sections.

The cart sections form a flat, stable platform for supporting pallets on the upper track section but bend easily around the arcuate forward track section for storage in an inverted position in an out-of-the-way location underneath the upper track section.

The individual carts are connected together by a connecting mechanism that includes the axle for the wheels. The wheels are mounted on axles that fit through aligned sleeves that are connected to adjacent cart sections, thus permitting rotation of the wheels as well as pivotal movement of the carts with respect to each other.

The present invention provides a compact and cost effective push-back rack system with interchangeable components, no stacking cart height limitations, and virtually unlimited bay depth.

These and other advantages and features of the present invention are described in detail below and shown in the appended drawings.

BRIEF DESCRIPTION OF THE DRAWINGS

FIG. 7 is an exploded perspective view showing the manner in which two carts or two cart sections are connected together.

FIG. 8 is a fragmentary sectional view taken along lines 8—8 of FIG. 2, showing the manner in which two carts or cart sections are connected together.

FIG. 9 is a fragmentary plan view showing the cart connection mechanism of FIG. 7 in an assembled condition.

DETAILED DESCRIPTION OF THE PREFERRED EMBODIMENTS

Figure 1:
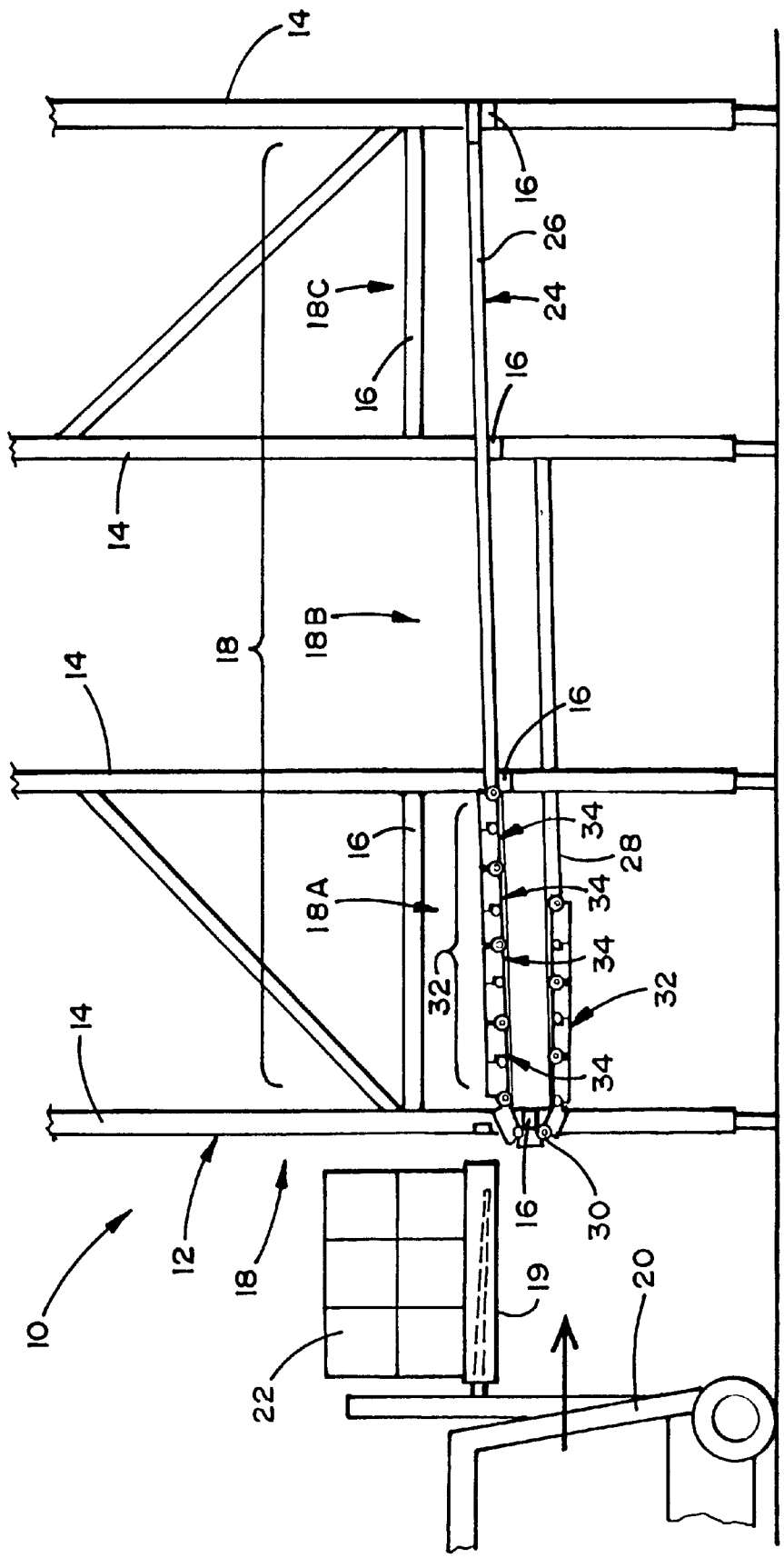
FIG. 1 is a side elevational view of a push-back rack system in accordance with the present invention.

Referring now to the drawings, an exemplary warehousing storage rack system 10, shown in FIG. 1, comprises a frame 12 consisting of spaced vertical columns 14 and horizontal beams 16 that define a series of vertically and horizontally spaced storage bays 18. A single storage bay 18 is shown in FIG. 1, with the storage bay comprising a front section 18A, a middle section 18B, and a rear section 18C. Each storage bay section is positioned one behind the other and is sized to accommodate a standard size of storage unit. In a typical situation, the storage unit is a pallet 19 which is loaded in the storage bay by a forklift truck 20 and which supports products or goods 22. A typical pallet is 40 inches wide and 48 inches in depth.

A track 24 extends from the front to the rear of the frame, with the track having an upper section 26, a lower section 28, and a curved or arcuate front section 30 that connects the upper and lower sections of the track. A carriage mechanism consists of a plurality of wheeled carts 32 that are mounted end-to-end in the track, with each cart being subdivided into separate wheeled cart sections 34.

Figure 2:
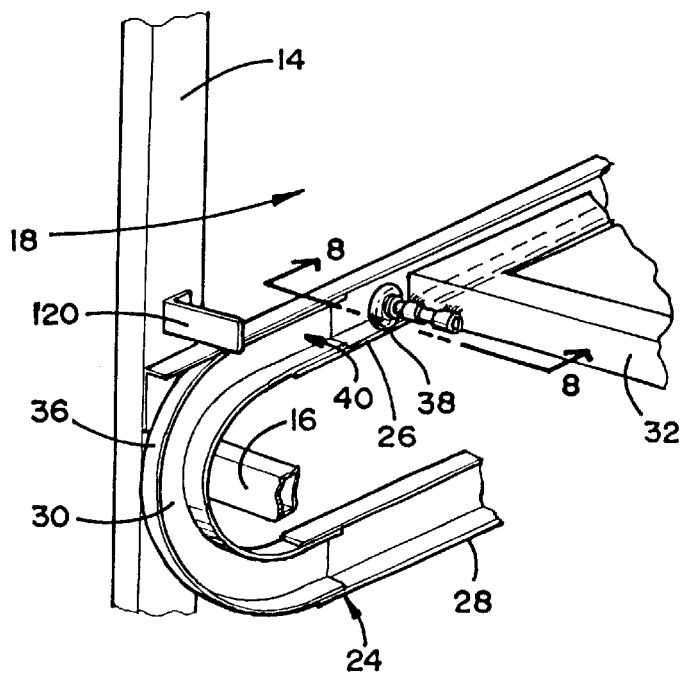
FIG. 2 is a fragmentary perspective view showing a forward corner of the track and cart system of the present invention.
Figure 3:
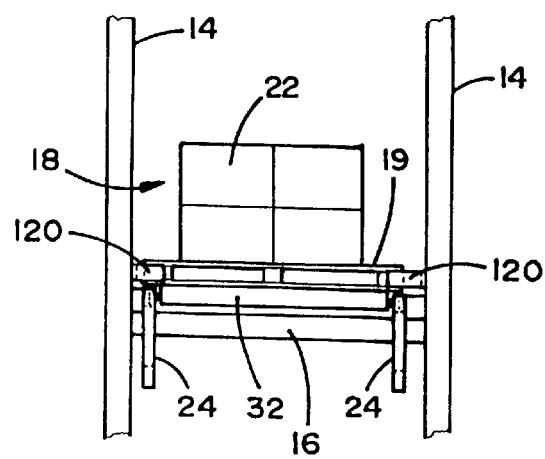
FIG. 3 is a front elevational view of the present invention showing a pallet storage unit positioned on one of the carts of the present invention.

Referring to FIGS. 2 and 3, track 24 comprises separate track sections positioned at opposite sides of storage bay 18, with the tracks being mounted on columns 14 and separated from the columns by a spacer in the form of a three inch tubular beam 36. Each track 24 comprises an inwardly facing C-shaped channel member, desirably about 3⅛ inches high on the inside between upper and lower flanges. Carts 32 are provided with wheels 38 at the four corners thereof, with the wheels extending outwardly from the sides of the carts and riding in channels 40 of the track.

Figure 10:
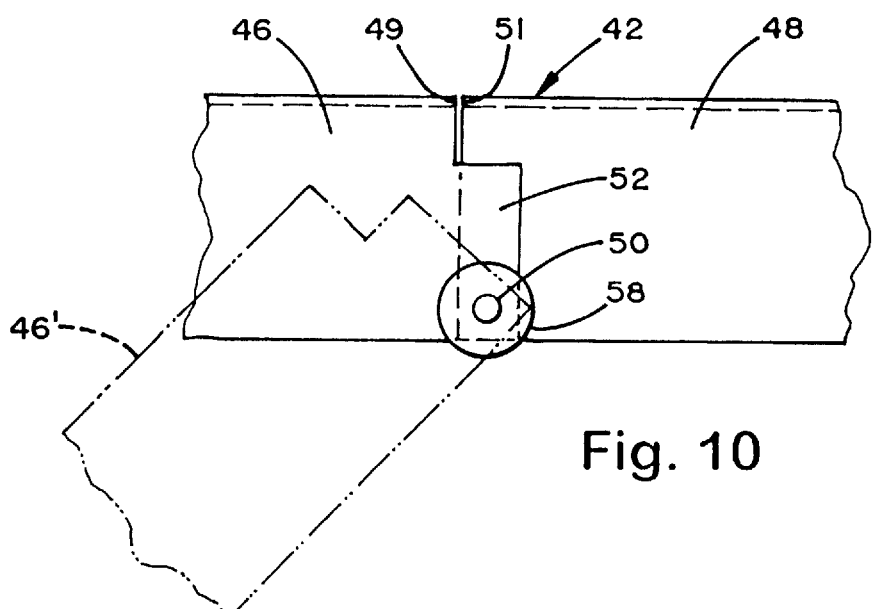
FIG. 10 is a fragmentary side elevational view of an intermediate portion of a cart section, showing the articulated side rails of the cart section.

The manner in which the carts are constructed are shown in FIGS. 5–12. In the illustrated embodiment, each cart 32 comprises four cart sections 34, with each cart section comprising a rectangular frame formed of right angle material. Each cart section comprises opposed side rails 42, a rear member 44, and a front member 45. Side rails 42 are articulated, as shown in FIG. 10. A front side rail section 46 is pivotally connected to a rear side rail section 48 by means of a rivet or pivot pin 50. Pivot pin 50 extends outwardly from the side of the cart and has a wheel 58 rotatably mounted thereon. This wheel engages the curved arcuate portion of the track and provides a low friction interface between that portion of the cart and the track. The top edge 49 of section 46 is recessed so that the forward edge of the side wall constitutes a flange 52 that overlaps the adjoining edge of side rail section 48. By constructing the side rails in this manner, the side rails can articulate downwardly as shown by phantom FIG. 46' in FIG. 10, in order to permit the cart sections to bend as they roll around the arcuate front section of the track. However, when the cart sections are positioned in a horizontal position on the upper track, upper edge 49 on section 46 engages upper edge 51 on section 48 and this prevents side rail 46 from pivoting upwardly with respect to side rail 48 beyond the horizontal position shown in FIG. 10. This prevents the cart from sagging under load when a platform is mounted on the cart.

The articulating side rails are an important feature of the present invention because of the dimensions of the structure. In the preferred practice of the present invention, the distance between the upper and lower track sections is minimized and desirably is about 11.5 inches. The individual cart sections are each about 11.25 inches long. Thus, it is necessary to articulate each of the individual cart sections in order to facilitate the movement of the cart sections around the curved front portion of the track while still minimizing the distance between the upper and lower track sections.

The manner in which the carts and individual cart sections 34 are connected together is shown in FIGS. 6–9. Cart sections 34 and carts 32 are all connected in the same manner. An axle shaft 60 having a head 62 and a narrow outer end 64 of reduced diameter fits through a plurality of tubular axle fittings 66 mounted on one of the carts and a tubular axle fitting 68 mounted on the other cart. Axle fittings 66 are spaced apart sufficiently that tubular fitting 68 can fit between them. Axle shaft 60 fits through the interior openings 70 in the axle fittings when the fitting 66 and 68 are placed into alignment with each other. A spring C-clip or E-clip 72 fits in groove 74 in the axle shaft and holds the shaft in the axle fittings. Wheels 38 fit on narrower shaft 64 and are held in place by a nut or pin or the like 73 on the outer end of shaft 64. A grease fitting 76 mounted on the end of axle shaft 60 can provide a means to supply grease through an interior opening 78 to grease outlets 80 for lubricating the axle shaft. The respective axle fittings are welded to the carriages.

In the preferred practice of the present invention, each cart section is formed of right angle material having perpendicular flanges two inches long and ⅛ inch thick. The axle fixtures forming the hinge of the present invention desirably have a one inch outside diameter, a 9/16 inch inside diameter, and are ½ inch long. The axle is a greasable axle ½ inch in diameter and 3½ inches in length. The wheels preferably are 1½ inches wide and 3 inches in diameter and can be formed of phenolic resin or can be a metal wheel with bearings (sometimes referred to as a skate wheel).

Figure 11:
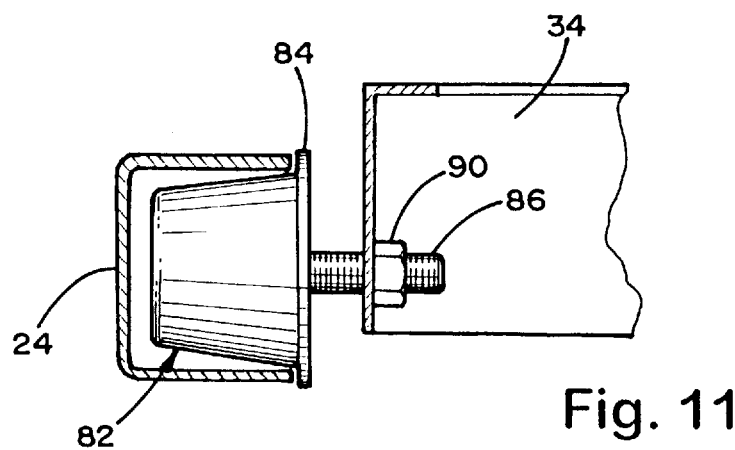
FIG. 11 is a fragmentary front sectional view showing a transverse alignment wheel on the cart riding in the track.
Figure 12:
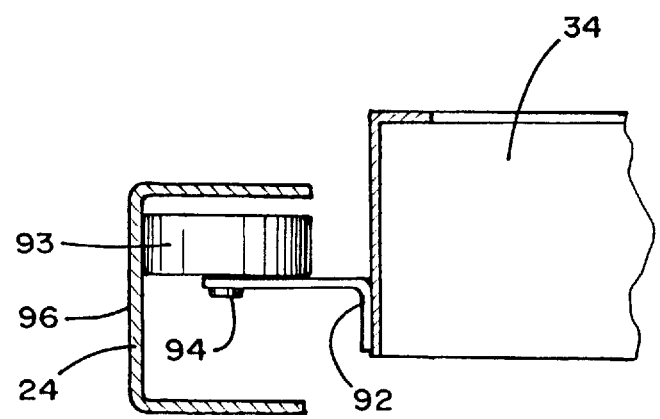
FIG. 12 is a fragmentary front sectional view showing an alternative embodiment of a transverse alignment wheel for maintaining proper transverse position of the carts.

Transverse movement of the carts from a side-to-side direction can be restricted by special transverse alignment wheels of the type shown in FIGS. 11 or 12. As shown in FIG. 11, wheel 82 is conical and tapered slightly inwardly as it extends outwardly so that it fits easily into track 24. The wheel desirably has a maximum diameter of three inches and a minimum diameter of 2¾ inches and a taper of 7–9°. The wheel also has a flange 84 extending radially greater than the distance between the upper and lower surfaces of the track (preferably the flange diameter is about 3½ inches), providing an inward limit that the wheel can extend into the track. This restricts lateral movement of the carriage. Desirably, the axle 86 of the wheel is threaded and is received in a threaded opening 90 in the cart. The lateral position of the alignment wheel thus can be adjusted.

Another embodiment of an alignment device is shown in FIG. 12. An angle fixture 92 is mounted to the side of the cart section with a horizontal wheel 93 mounted on a vertical axle 94 on flange 92. The wheel engages outer wall 96 of channel 24 and constrains lateral movement of the cart section.

Figure 13:
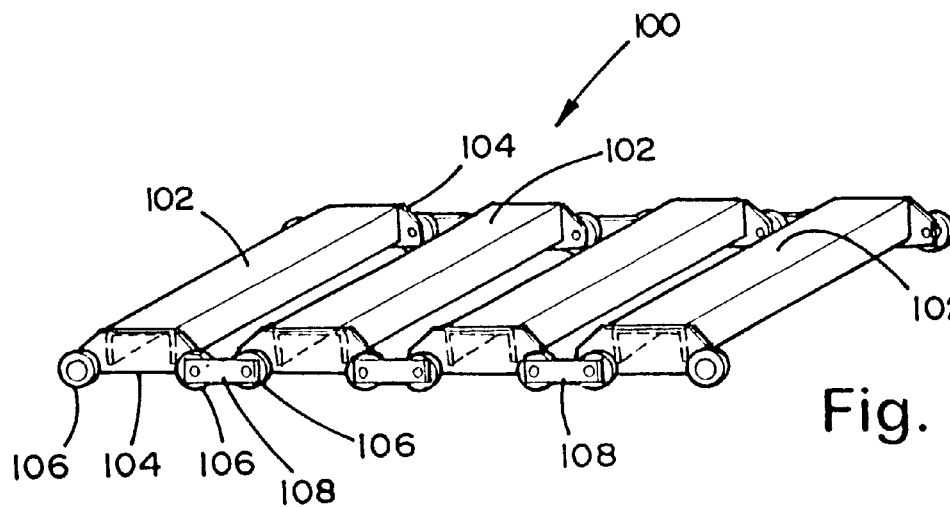
FIG. 13 is a perspective view of an alternative embodiment of the cart system of the present invention.
Figure 14:
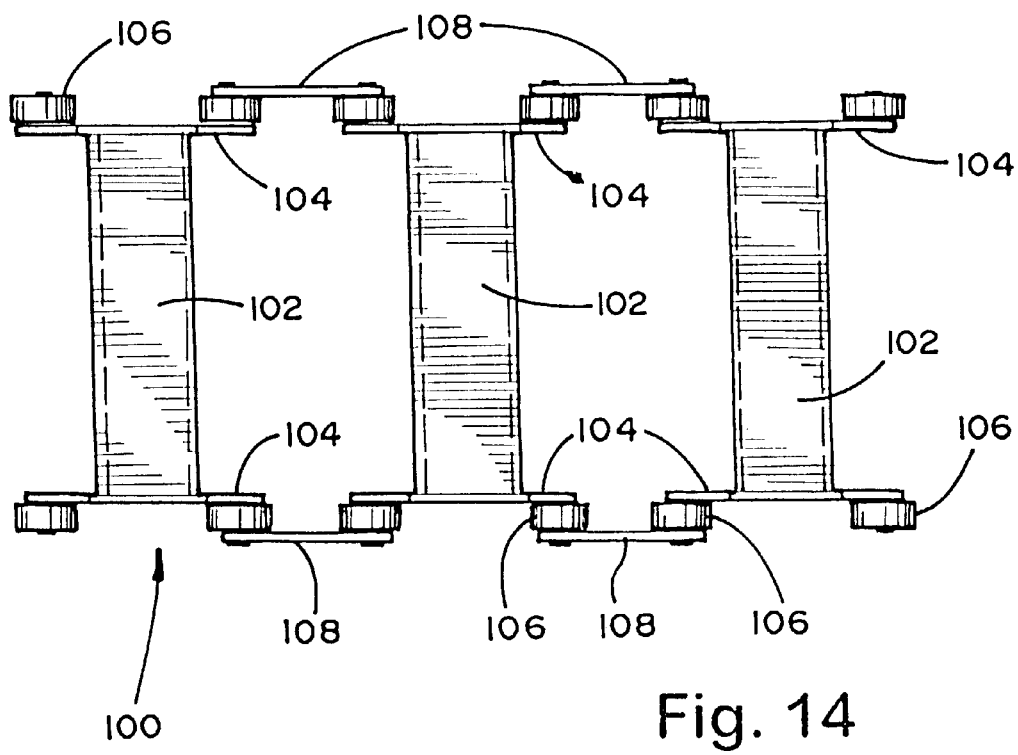
FIG. 14 is a plan view of the cart system of FIG. 13.
Figure 15:
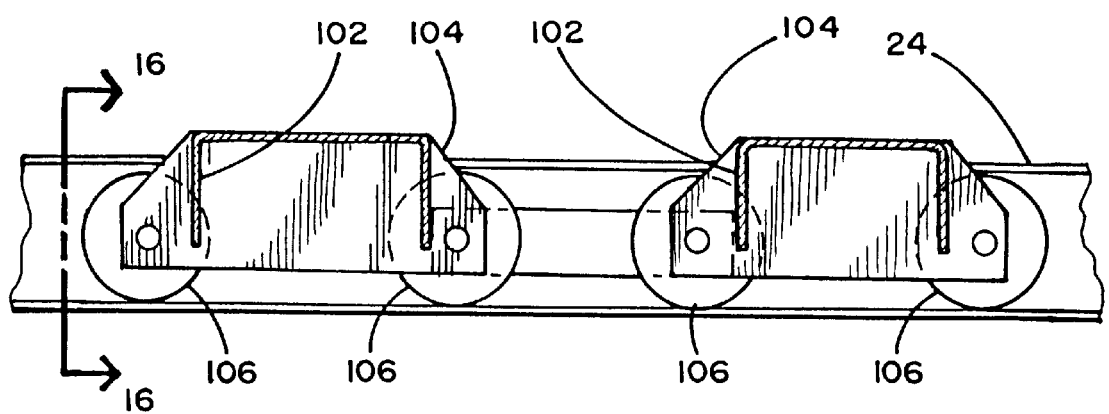
FIG. 15 is a side elevational view of a portion of the cart system of FIG. 13, showing the wheels of the cart system riding in a section of track.
Figure 16:
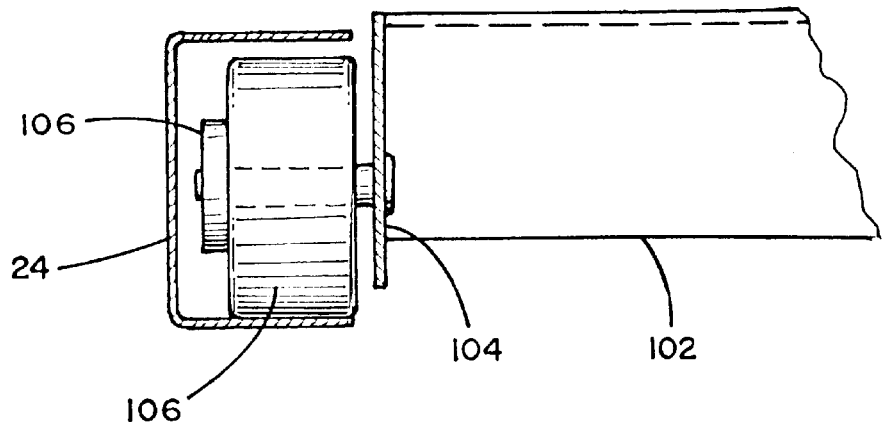
FIG. 16 is a sectional view taken along line 16—16 of FIG. 15.

Another embodiment of the cart of the present invention is shown in FIG. 13. Cart 100 comprises a plurality of longitudinally spaced C-shaped cross beams 102, which are mounted to plates 104 at each end thereof. Plates 104 have wheels 106 mounted thereon. Links 108 interconnect the adjacent wheels on each cross beam. Links 108 permit relative pivotal movement of the respective cross beams. The same type of lateral alignment mechanism described above and shown in FIGS. 11 and 12 can be employed with this embodiment of the invention.

Figure 4:
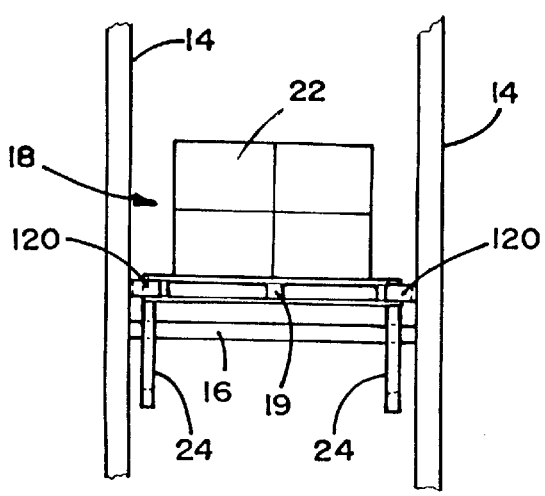
FIG. 4 is a front elevational view similar to FIG. 3, wherein a final pallet rests on the rails of the track system.
Figure 5:
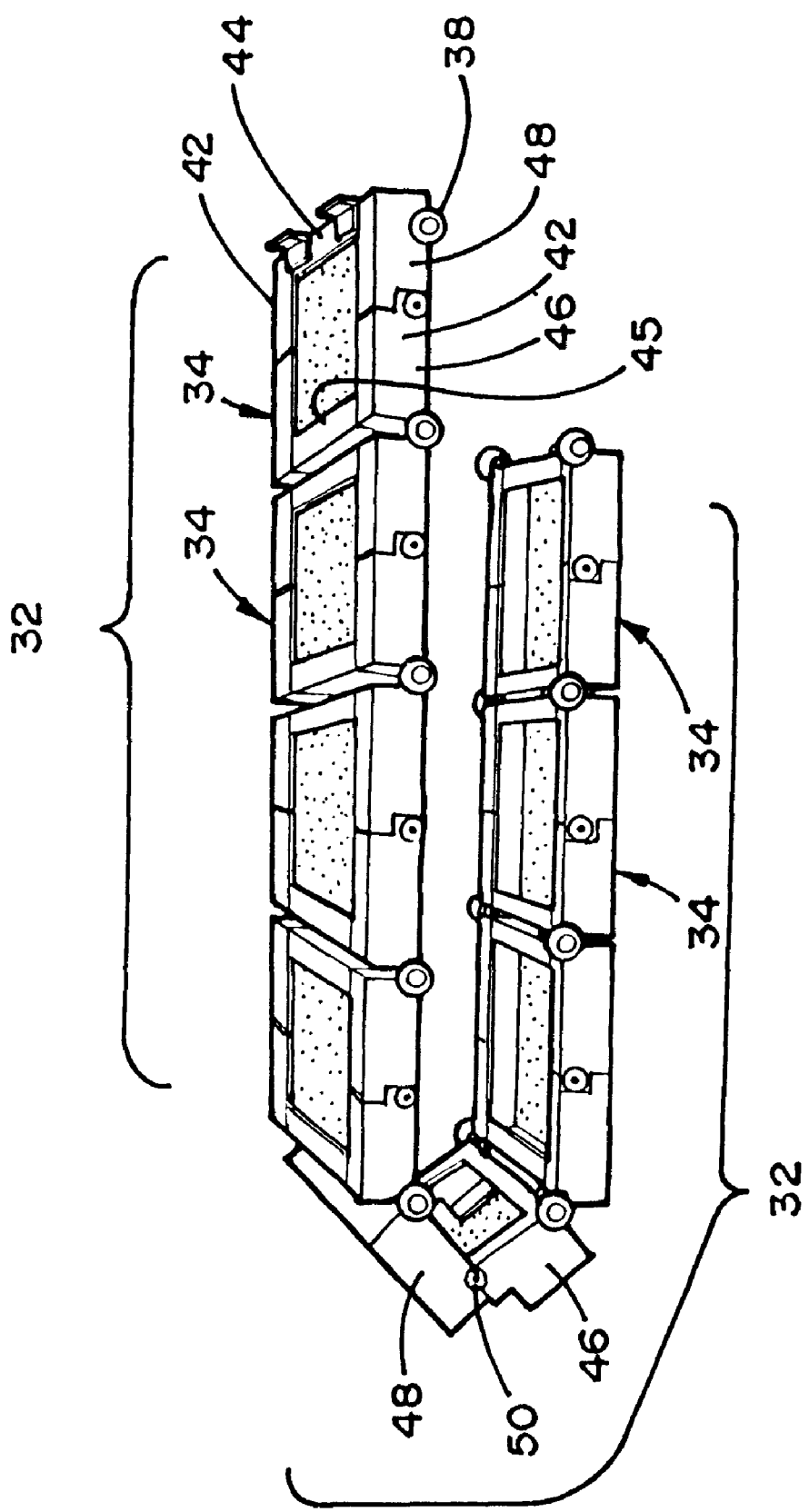
FIG. 5 is a perspective view showing the wheeled carts of the present invention.
Figure 6:
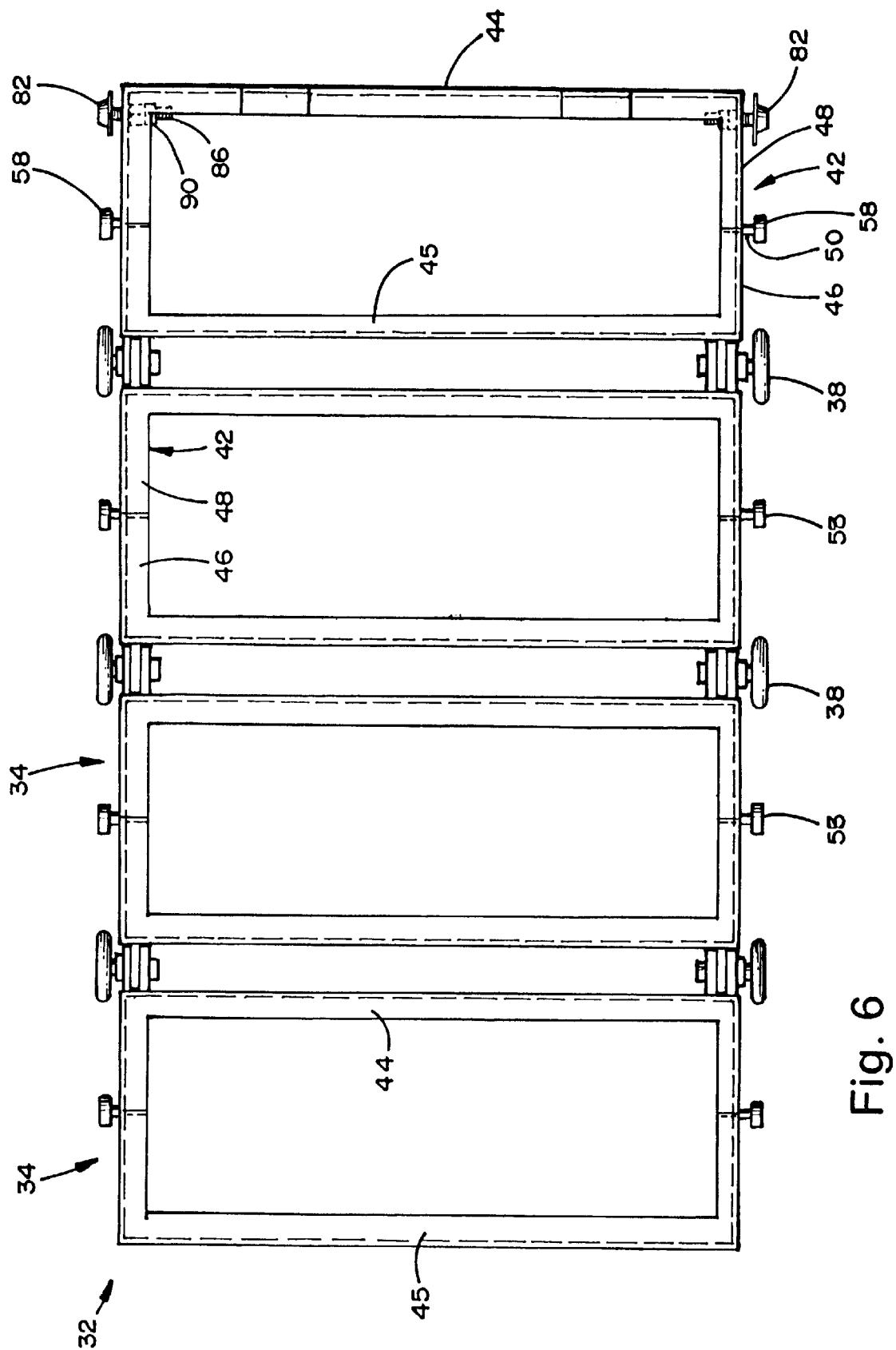
FIG. 6 is a plan view of one cart section of the present invention.
Figure 18:
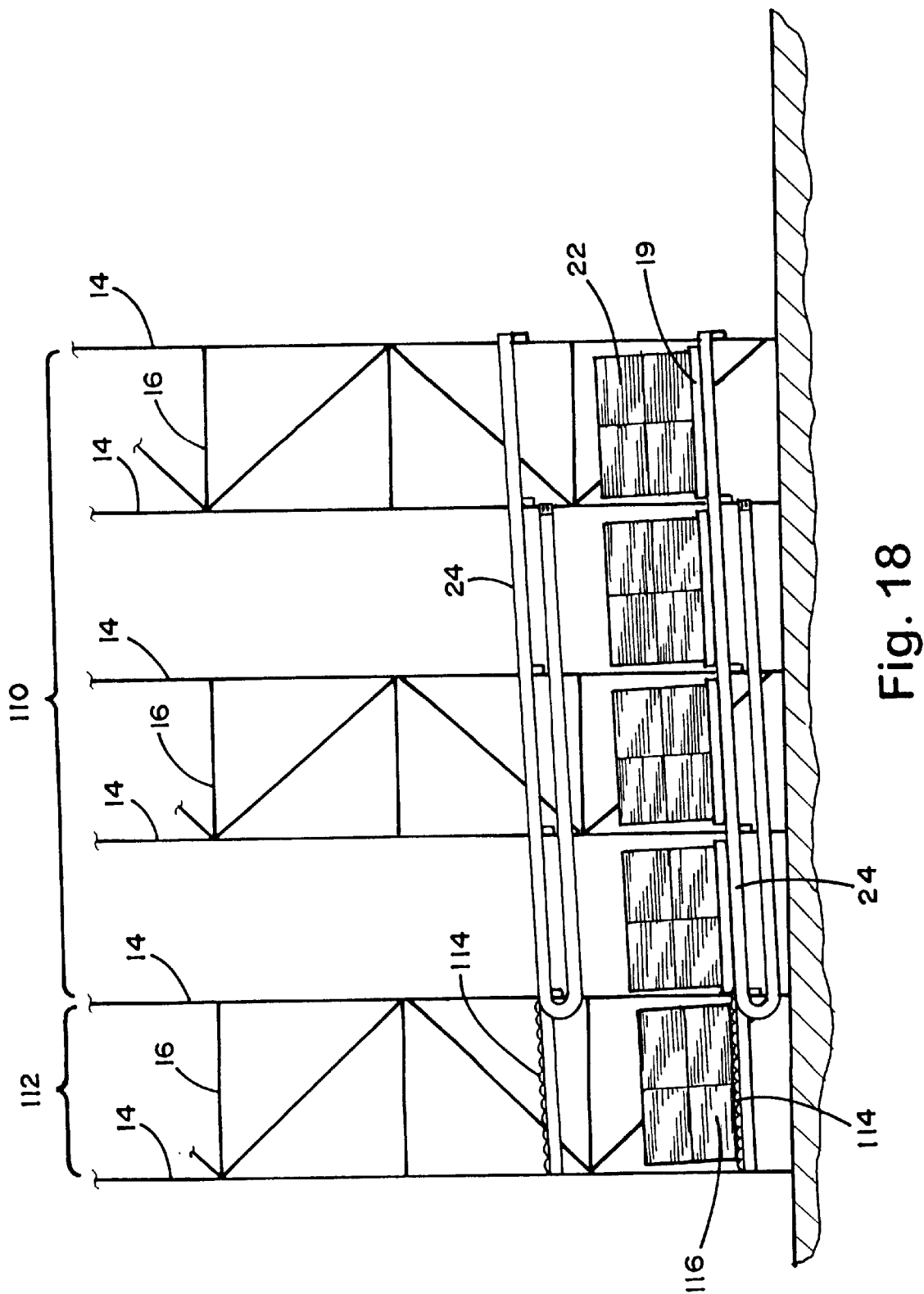
FIG. 18 is an alternative embodiment showing the use of a separate pallet loading station at the front of the push-back rack system of the present invention.

A modified embodiment of the present invention is shown in FIG. 18. In FIG. 18, the push-back rack structure 110, shown in the right hand portion of the figure, is substantially the same as the rack structure described above, with the exception that an additional storage compartment is provided in each bay, each bay being four storage units deep. To accommodate four storage units, it is necessary that the carriage or cart train be three carts long. After the three carts are moved to the rear, a final pallet can be placed on the rails themselves, as shown in FIG. 4.

An additional feature of the embodiment of FIG. 18 is that an additional rack section 112 is positioned at the front of the rack and is provided with a series of rollers 114. This makes it possible to load a pallet 116 on section 112 and thereafter push the pallet onto the roll back rack. With the extra section 112 at the front of the rack, this rack can store pallets in a single bay to a depth of five pallets. Also as shown in the FIG. 18 embodiment, storage bays can be positioned one above the other to any desired height.

While storage mechanisms employing two and three cart units are shown in the present invention, an advantage of the present system is that almost any number of carts can be employed in the rack system.

Figure 17A:
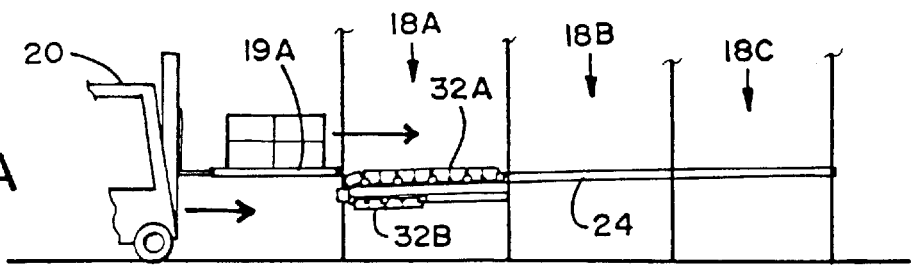
FIGS. 17A–17D are schematic drawings showing the manner in which the present invention is used for loading multiple pallets in a storage bay.

The operation of the present invention is shown in FIG. 17A–D for an exemplary system using a bay that is three units deep. In FIG. 17A, a pallet 19A is placed on cart 32A. A stop plate 120 (shown in FIGS. 2, 3 and 4) prevents the loaded pallet from rolling under the influence of gravity out through the open end of the bay after the forklift truck has been removed. Stop plate is a right angle plate spaced about one inch above the carriage assembly. The stop plate is about three inches high and has a three inch long flange attached to column A and a 4½ to 7 inch long stop flange that extends over the track and into the path of the pallet.

Figure 17B:
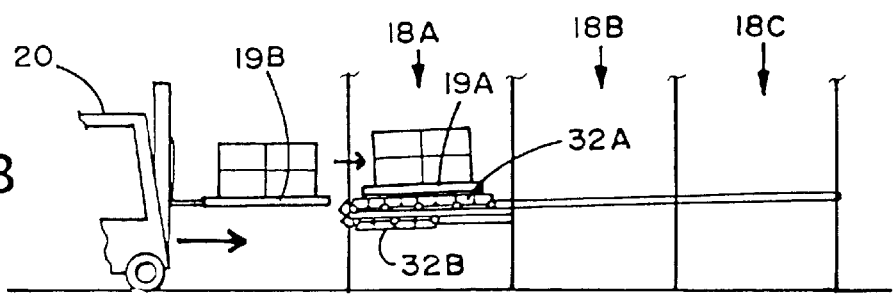
Figure 17C:
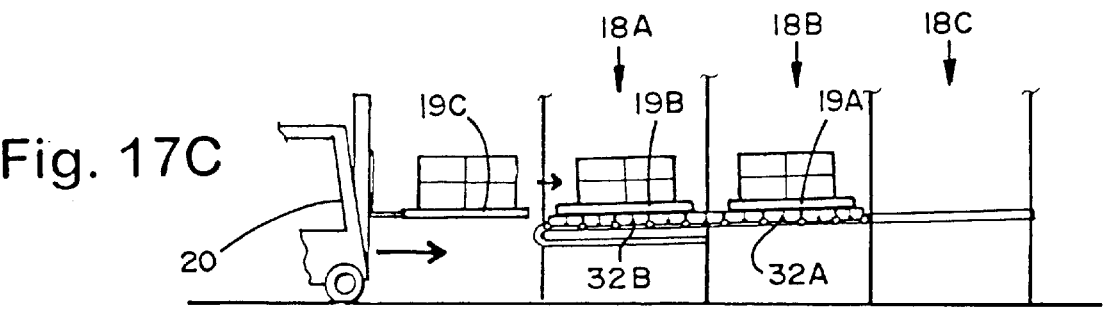
Figure 17D:
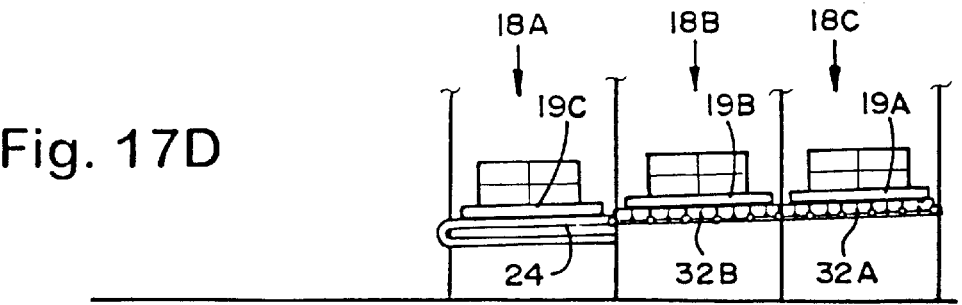

As shown in FIG. 17B, when pallet 19B is pressed against pallet 19A, pallet 19A rolls along with cart 32A to section 18B of the storage rack bay. Similarly, as shown in FIG. 17C, when pallet 19C is pushed against pallet 19B, all of the pallets slide inwardly one station further, so that (as shown in FIG. 17D) pallet 19A and cart 32A are in section 18C of the bay. Similarly, pallet 19C and cart 32B are in section 18B of the bay. Finally, pallet 19C sits on the rail 24 in section 18A of the bay. Stop 120 prevents any of the pallets from sliding outwardly unless lifted over the stop. The reverse operation is accomplished in removing the pallets from the rack, with gravity causing the cart to roll forwardly as each pallet at the front of the rack is removed. Desirably, the track is inclined at an inclination of 2 inches per 10 feet of rack length.

In the present invention, a simple C-channel track can be used to support and guide the carts. This track can be formed in uniform sections of 8 feet in length or so, with each section being cut to size and bolted together as desired. Thus, only straight sections of uniform track and the curved front portion of the track need to be prefabricated.

It should be understood that the foregoing is merely exemplary of the preferred practice of the present invention and that various changes and modifications may be made in the arrangements and details of construction of the embodiments disclosed herein without departing from the spirit and scope of the present invention, as defined in the appended claims.

I claim:

1. A push-back storage rack for storing individual storage units comprising:

a frame defining at least one storage bay having a depth sufficient to accommodate a plurality of separate storage units; and a track-mounted carriage assembly mounted in the bay, the carriage assembly comprising at least two carts, each sized to hold separate storage units, the carts being connected together end-to-end for pivotal movement about a transverse horizontal axis, the carts being movably supported and guided by a track, the track being formed and mounted so as to guide the carts for movement between a front and a rear of the bay on an upper track section, and to direct at least a forwardmost cart downwardly and then rearwardly in the bay in an inverted position on a lower track section as the carts are moved forwardly at a front end of the upper track section, the forwardmost cart thereafter being pulled forwardly and then upwardly to the upper track section as a rearmost cart is pushed rearwardly on the upper track section.

2. A push-back storage rack according to claim 1 wherein the track comprises opposed side sections on opposite sides of the bay and a generally straight upper section and an arcuate front section that joins the upper and lower track sections.

3. A push-back storage rack according to claim 2 wherein the tracks comprise horizontal support surfaces that support track contact elements on the carts.

4. A push-back rack according to claim 3 wherein the track contact elements are wheels and the track section comprises inwardly facing C-shaped channel members in which the wheels fit.

5. A push-back rack according to claim 1 wherein at least the forwardmost cart comprises a plurality of separate cart sections connected together end-to-end for pivotal movement in a vertical plane with respect to each other, each cart section being supported by wheels at each end that ride on the track.

6. A push-back rack according to claim 1 wherein at least the forwardmost cart comprises at least two sections pivotally connected together for at least limited relative pivotal movement in a vertical plane.

7. A push-back rack according to claim 6 wherein the sections of said forwardmost cart are pivotal in one direction that facilitates movement of the cart around an arcuate section of the track but said sections are substantially not pivotal past a position of horizontal alignment in the opposite pivotal direction.

8. A push-back rack according to claim 1 wherein the upper section of track is inclined downwardly and forwardly toward the front of the bay, such that gravity urges the carts and storage units thereon to move toward the front of the bay on the upper track.

9. A push-back storage rack for storing individual storage units comprising:

a frame defining at least one storage bay having a depth sufficient to accommodate a plurality of separate storage units;

a track-mounted carriage assembly mounted in the bay for supporting multiple storage units, the carriage assembly comprising a plurality of carts that are connected together end-to-end for pivotal movement about transverse horizontal axes, the carts being movably supported and guided by a track, the track being formed and mounted so as to guide the carts for movement between a front and a rear of the bay on an upper track section, and to direct at least a forwardmost cart downwardly and then rearwardly in the bay in an inverted position on a lower track section as the carts are moved forwardly at a front end of the upper track section, the forwardmost cart thereafter being pulled forwardly and then upwardly to the upper track section as a rearward cart is pushed rearwardly on the upper track section, the carts comprising frame members mounted on wheels at front and rear ends of the frame, with the wheels riding on the tracks, adjacent carts being mounted on common wheels positioned at junctions between the carts.

10. A push-back rack according to claim 9 wherein the wheels are mounted on axles, adjacent carts having wheel support fixtures at corners of the carts, with the wheel support fixtures of adjacent carts having axle openings therein that are alignable and are connected together by insertion of the axles therethrough, the connection between the axles and the wheel support fixtures providing a means by which the carts are connected together.

11. A push-back rack according to claim 10 wherein at least one cart comprises a plurality of separate, longitudinally aligned cart sections, with the cart sections being connected together by wheels in substantially the same manner as the separate carts.

12. A push-back rack according to claim 1 wherein each cart comprises one or more transverse support beams having wheels mounted at opposite ends thereof, the wheels riding on sections of the track at each end of the beams, the beams being pivotally interconnected for movement in a vertical plane by longitudinal links that interconnect the beams.

13. A push-back storage rack for storing individual storage units comprising:

a frame defining at least one storage bay having a depth sufficient to accommodate a plurality of separate storage units;

a generally U-shaped track mounted in the storage bay, the track including upper and lower track sections mounted one above the other and having front ends that are connected together by a front section of track;

a carriage assembly mounted on the track, the carriage assembly comprising a plurality of individual cart sections mounted on the track by track contact elements for the cart section, the cart sections being connected together for pivotal movement about a transverse horizontal axis, the carriage assembly being guided by the track such that as individual cart sections move forwardly on the upper track section and reach the front of the track the cart sections move downwardly to the lower track section and then move rearwardly on the lower track section in an inverted position, the lower track section serving to store cart sections until they are needed for use.

14. A push-back storage rack according to claim 13 wherein:

the cart sections comprise transverse beams mounted on wheels at opposite ends of the beams, the carts being connected together by pivot links; and the track comprising rails at opposite sides of the storage bay on which the wheels of the cart sections ride, the rails being formed to support the cart sections in upright and inverted positions on the upper and lower track sections and to guide the cart sections between inverted and upright positions as they traverse between the upper and lower track section.

15. A push-back rack according to claim 14 wherein the transverse beams are mounted on mounting plates at opposite ends thereof and the wheels are mounted on the mounting plates, the pivot links interconnecting the mounting plates.

16. A push-back storage rack according to claim 13 wherein a fixed position rack is positioned adjacent to and forward of the front section of the track, such that a storage unit can be positioned on the fixed position rack before it is pushed on the carriage assembly.

17. A push-back storage rack according to claim 16 wherein the fixed position rack includes rollers to facilitate storage unit movement thereon.

18. A push-back storage rack according to claim 13 wherein the upper track section is inclined downwardly and forwardly such that storage units positioned thereon are urged to gravitate toward the front of the storage bay, the storage rack including stop members that engage storage units to prevent the storage units from moving off the front of the storage rack.

19. A push-back storage rack according to claim 14 wherein upper surfaces of the beams support storage units when the cart sections are in their upright positions, the upper surfaces being positioned above the track such that storage units can extend laterally to a position above the track without engaging the track.

20. A push-back storage rack according to claim 13 wherein the front section of track extends downwardly in a curved path from the front end of the upper track section to the front end of the lower track section.

* * * * *